United States Patent [19]
Fraser

[11] 3,728,948
[45] Apr. 24, 1973

[54] IMAGE MOTION COMPENSATION MECHANISM

[75] Inventor: David B. Fraser, Maple Glen, Pa.

[73] Assignee: Dynasciences Corporation, Los Angeles, Calif.

[22] Filed: Dec. 28, 1970

[21] Appl. No.: 101,951

[52] U.S. Cl. ................................. 95/12.5, 350/16
[51] Int. Cl. ................................................. G03b
[58] Field of Search ..................... 350/16; 95/12.5

[56] References Cited

UNITED STATES PATENTS

| | | | |
|---|---|---|---|
| 3,557,205 | 5/1971 | Hobrough | 350/16 |
| 3,459,473 | 8/1969 | Call | 95/12.5 X |
| 3,504,957 | 4/1970 | Heflinger et al. | 350/16 |
| 3,531,176 | 9/1970 | Humphrey | 95/12.5 X |
| 3,468,595 | 9/1969 | Humphrey | 350/16 |
| 2,829,557 | 4/1958 | Jensen | 350/16 |

*Primary Examiner*—Samuel S. Matthews
*Assistant Examiner*—Kenneth C. Hutchison
*Attorney*—Lewis M. Dalgarn

[57] ABSTRACT

An image motion compensation mechanism for an optical system in which random angular motion of the viewing device is compensated by a pivotal system in which the objective lens is mounted on an inertial balance member so as to pivot relative to a predetermined plane in the optical path in order to maintain the optical axis of the objective parallel to the desired line of sight. If the system is a telescope or other such viewing device, the pivot plane is defined at a distance from the objective related to the magnification of the system. If the system is a camera, the plane is coincident with the film plane.

11 Claims, 7 Drawing Figures

PATENTED APR 24 1973

3,728,948

INVENTOR.
DAVID B. FRASER
BY
Lewis M Dalgarn
ATTORNEY

INVENTOR.
DAVID B. FRASER
BY
ATTORNEY

IMAGE MOTION COMPENSATION MECHANISM

FIELD OF THE INVENTION

This invention relates to image motion compensation systems, and more particularly, to a system for maintaining a stable image by compensating for small, angular deviations of an optical system from a desired line of sight.

BACKGROUND OF THE INVENTION

Optical systems of various types must frequently be used without stabilizing supports capable of maintaining the optical path of the system coincident with a desired line of sight. When the optical path of the system undergoes random, angular deviations from the desired line of sight, the image moves in the plane of observation thereby blurring the observed view. This problem is most commonly encountered in the use of optical systems that are either hand held or operated in a vibrating environment such as a moving vehicle. With cameras, such image motion in the film plane causes blurring of details in the photograph; and with direct viewing systems, such as telescopes and binoculars, the observer's view may be similarly blurred.

Various methods and apparatus have been employed for preventing or compensating for such random image motion. These include various complex refractive systems, electronic systems, and inertially-stabilized mirror systems that employ complicated instrumentation and delicately aligned optical components. Besides being costly to construct and operate, the additional optical elements required in the light path for these systems increases the number of refractive or reflective surfaces thereby decreasing the quality of the observed image. Many systems also require the use of some form of external power. Still other systems require the use of a fixed power erector lens, an arrangement which does not allow the use of an erecting zoom system and requires that the objective lens operate "off axis" under a vibrating environment. The present device overcomes both of these latter shortcomings while retaining a similar simplicity.

SUMMARY OF THE INVENTION

The present invention provides compensation for small angular motions of an optical system without the utilization of electronics and without the addition of refracting or reflecting surfaces in the light path. Rather, simple mechanical components are utilized to maintain the alignment of the lens components in the system so as to compensate for such angular motion. Specifically, the present invention relates to optical systems having an optical path with an objective lens. Random angular motion is decoupled from the objective lens by gimbaling it about a pivot plane which is perpendicular to the desired line of sight.

In those systems which include an ocular for observation of the image, and where all optical elements except this ocular or image receiving member are mounted on the gimbal, the pivot plane is coincident with the first principal surface of the ocular. In those systems which include an ocular for observation of the image and where there is an unstabilized erecting system or image receiving member between this image and the first image formed by the objective, the pivot plane is ahead of the image formed by the objective by an amount equal to the focal length of the objective divided by the magnification of the system. In camera systems the pivot plane is coincident with the film or image receiving member plane of the camera or another image plane.

In particular embodiments, means are provided for caging the gimbals so as to limit compensation, e.g., during panning or where rapid angular acceleration is desired. Mechanical springs or magnetic means can be provided for static restoration of the optical system, or electrical means can be utilized for directionally sensing misalignment from normal of components of the system whereby a signal thereof is generated, and means responsive to the sensor activates a restoring force.

DETAILED DESCRIPTION

As required, detailed illustrative embodiments of the invention are disclosed herein. However, it is to be understood that these embodiments merely exemplify the invention which may take many different forms that are significantly different from the specific illustrative embodiments disclosed. Therefore, specific structural and functional details disclosed herein are not to be interpreted as limiting, but merely as a basis for the claims in defining the scope of the invention. In this regard, the illustrative embodiments herein comprise a terrestrial telescope and a camera; however, it is to be emphasized that the inventive concepts herein are readily adaptable with respect to image inverting telescopes, including those in which both real and virtual images are observable, binoculars, reflecting telescopes, mirror lenses, and the like.

Figure 1:
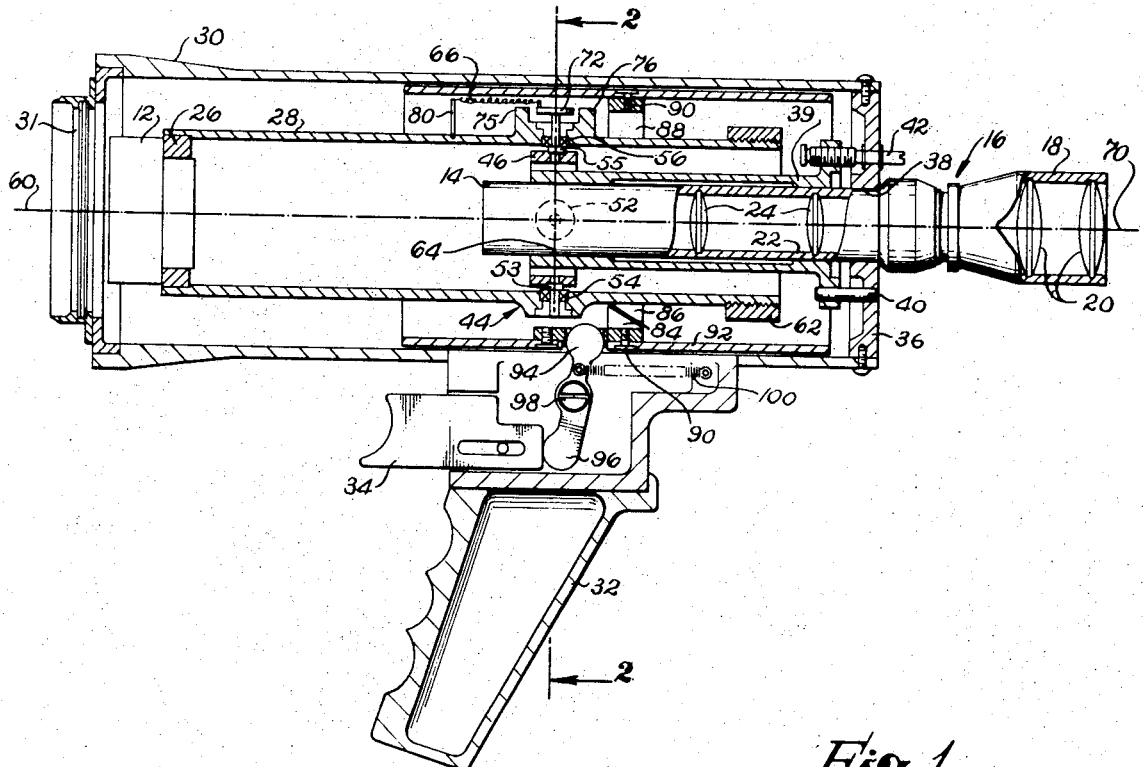
FIG. 1 is a schematic, cross-sectional view of components of an image motion compensating mechanism of this invention.
Figure 2:
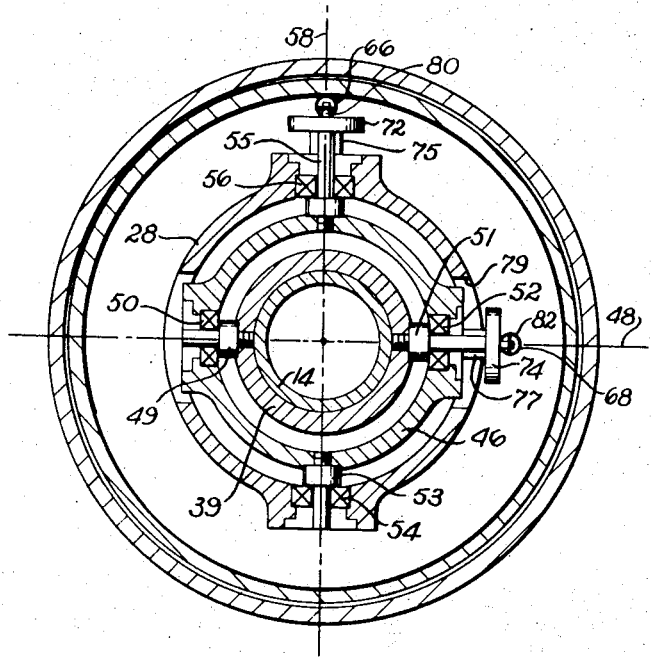
FIG. 2 is a sectional view taken along line 2—2 of FIG. 1.

Referring to FIGS. 1 and 2, which illustrate schematically one form of the invention, a terrestrial telescope is shown which has an objective lens 12 and an optic tube 14, shown broken away for clarity of illustration, including components of an erecting and zoom member 16. The erecting and zoom member 16 includes an ocular section 18 containing ocular lenses 20 and a middle optic tube section 22 containing a zoom erecting lens array 24. The lenses depicted herein are in schematic form only and may in practice be formed of several elements to effect chromatic and stigmatic corrections as desired. The objective lens 12 is carried in a lens adapter ring 26 at the front of a tubular housing 28 which serves as a decoupled gimbal ring as hereinafter described. The objective housing 28 is carried within a tubular assembly housing 30 which is provided with a hand grip 32 at its lower side having a trigger 34 and mechanism therefor to be described hereinafter in more detail. A front glass 31 closes the assembly housing 30.

The assembly housing 30 is fitted with a back plate 36 which has a central opening 38 to mount the zoom and erecting section 22. A jack screw 42 is used to slide the gimbal mounting tube 39 forward and backward in order to focus the image from the objective. A dowel pin 40 along with the jack screw 42 prevents the tube 39 from rotating. As a result of the foregoing construction, the middle optic tube section 22 and the ocular section 18 are mounted to the housing 30 while the objective lens 12 is attached to the housing 30 through a gimbal indicated generally at 44.

Referring additionally to FIG. 2, the pivot mechanism is a conventional two-axis gimbal which is "inside out" inasmuch as the innermost member is undecoupled. This undecoupled member is the focusing tube 39; the decoupled member is the objective housing 28. The first gimbal ring 46 is decoupled in the first axis, indicated at 48, by gimbal pins 49 and 51, extending from the outer surface of the focusing tube 39, through the first set of gimbal bearings 50 and 52. The second gimbal ring, i.e., the objective housing 28, is decoupled by gimbal pins 53 and 55, extending from the outer surface of the first gimbal ring 46, through the second set of gimbal bearings 54 and 56, in the second axis, indicated at 58. Therefore, the objective lens 12 is decoupled from the remainder of the device, and from any input motions, in two axes, both of which are perpendicular to the static optical axis, indicated at 60 (FIG. 1).

A symmetrical inertial balance member in the form of an annular weight 62 is carried on the rear end of the objective housing 28. The weight 62 provides a mass spaced at such a distance from the pivots defined by the gimbal pins 49, 51, 53 and 55, as to statically balance the objective housing 28 about the pivot plane, indicated at 64.

Centering springs 66 and 68 are provided on each axis to slowly restore the objective housing 28 such that its optical axis 60 is coincident with the rear optical axis, indicated at 70. Two dampers 72 and 74 are provided, one on each axis, so as to damp out any oscillatory motion of the objective housing caused by the centering springs 66 and 68. The dampers 72 and 74 are rotary fluid shear devices and are positioned one on each gimbal axis.

Referring only to FIG. 1, in order to cage the objective housing 28 and prevent any relative motion between it and the remainder of the unit, a caging wedge 84 is pulled against a caging block 86. The caging block 86 is mounted around the objective housing 28 so as to engage the caging wedge 84. The caging wedge 84 is carried by a caging ring 88 which, in turn, is secured, by bolts 90, to a sleeve 92 which slides inside the assembly housing 30. The sleeve 92 is keyed by the head 94 of a lever link 96 which turns on a pivot pin 98 and is loaded by a spring 100 to a rearward position. The trigger 34 slides within the handle grip 32 so that as it is moved rearward it engages and pivots the lever link 96 to move the sleeve 92 and caging wedge 84 forward. Accordingly, when stabilized viewing is desired, the trigger 34 is pulled back thereby removing the caging wedge 84 from the caging block 86.

Figure 3A:
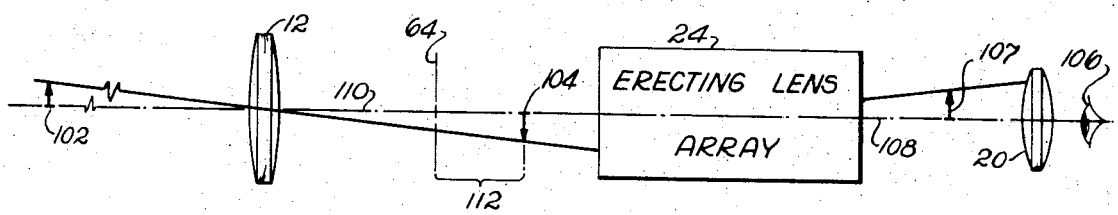
FIGS. 3A and 3B, and FIGS. 4A and 4B are schematic sequence-use representations of compensation mechanisms in accordance with the invention.
Figure 3B:
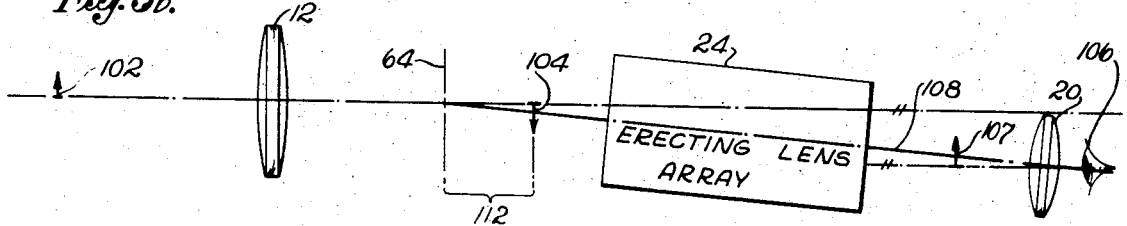

Referring now to FIGS. 3A and 3B which schematically illustrate operation of a motion compensating mechanism of the type hereinabove described, an object 102 is imaged by the objective lens 12 at its image plane 104. The image is erected by the erecting lens array 24, forms a second image 107, which is inspected by the eye 106 by means of the ocular lens 20. Without motion, the optical axis of the ocular 20, and erecting lens array 24, indicated at 108 is coincident with the optical axis of the objective lens, indicated at 110. Without the gimbaling arrangement as hereinbefore described, upon disturbing random motion, the image as viewed by the eye 106 would be blurred. However, referring to FIG. 3B, as a result of gimbaling of the objective lens 12 at the pivot plane 64 (see also FIG. 1), the objective lens 12 is free to form its image at location 104 so as to allow the erecting lens array 24 to reimage it for the ocular 20 such that the eye sees it in the same position as before.

By counter balancing the objective lens about the pivot plane 64, the instrument is compensated for random angular motion of the device case relative to an initial line-of-sight by tending to maintain the axis of the objective 12 parallel to the initial line-of-sight.

As previously indicated, when the gimbal system is contained within a lens erecting telescope, where the erecting array is not gimbaled, the pivot plane 64 is disposed ahead of the image plane 104 by an amount, indicated at 112, equal to the focal length of the eyepiece lens 20 divided by the magnification of the erecting lens array 24. Another way of stating the same relationship is that the pivot plane is located a distance towards the objective from the image formed by the objective an amount which is equal to the effective focal length of the objective divided by the magnification of the total optical system. With such a system, the motion of the housing 30 is totally compensated, that is, no apparent net motion results in the image seen by the eye. This is accomplished because the system still focuses the image 107 in the correct position for viewing by the eye through the ocular lens 20. Of course, a slight deviation from the ideal location of the pivot plane can be tolerated, especially where the eye is to view the final image.

The location of the gimbal plane is determined by the requirement that the final image be stabilized, whether the stabilization occurs in the eye or in the film plane. The final image is stabilized when it is always formed in the same position relative to the unstabilized optical portion of the system, such as the ocular where all other elements are stabilized or an unstabilized erecting section or the film plane of a camera, so that the eye or the film can always "view" the final image in the same position.

The location of the pivot or gimbal plane can be easily determined by anyone skilled in the art given the teachings of this invention. The formulas given herein are examples of how to locate the pivot plane in specific structures. In the system of FIGS. 1-3, the erecting lens 24 was mechanically tied to the ocular. In one modification of such a system (not shown), the erecting lens 24 can be mechanically tied to the objective lens 12 so as to be decoupled with the objective lens about the pivot plane. In such a case, the pivot plane would be coincident with the forwardmost principal surface of the ocular lens array. As a general rule, if the ocular is the only undecoupled optical element in the system, the pivot plane will lie coincident with the ocular's first principal plane, that is the pivot plane will be spaced from the first image plane formed after the decoupled section, e.g., 118, by an amount dependent upon the focal length of the ocular divided by the magnification of any intervening undecoupled sections. Or, in other words, by an amount equal to the effective focal length of all of the elements of the decoupled section divided by the magnification of the total optical system.

Figure 4A:
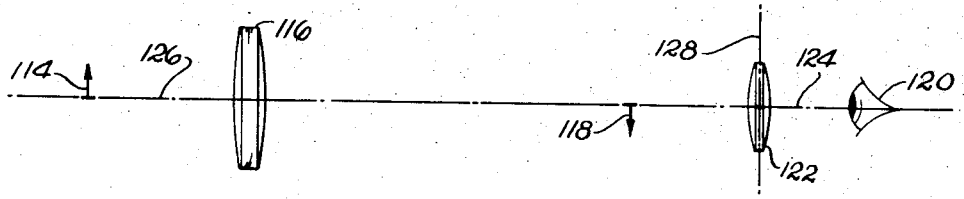
Figure 4B:
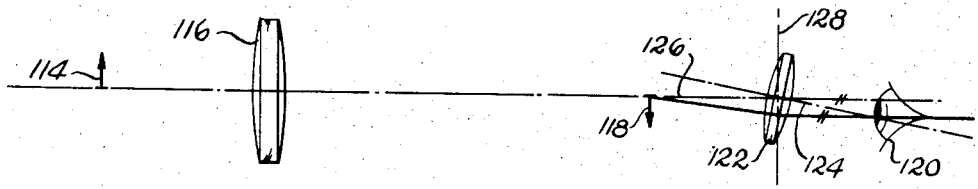

FIGS. 4A and 4B schematically illustrate operation of a motion compensating mechanism of alternative construction, and represent the operation of a gimbaled inverting or astronomical telescope. The object 114 to be viewed is imaged by the objective lens 116 at its image plane 118. This image plane 118 is inspected by the eye 120 by means of the ocular 122. Without motion, the optical axis of the ocular, indicated at 124, is coincident with the optical axis of the objective, indicated at 126. However, with a disturbing random motion, the ocular optical axis 124 is allowed to change with respect to the objective optical axis 126 inasmuch as the objective 116 is gimbaled at the pivot plane 128, which in this case is coincident with the ocular 122. As can be seen, the objective optical axis 126 still passes through the center of the ocular 122 and is viewed by the eye 120, although the ocular 122 and the case, not shown, have rotated by the amount of angular motion input. In order to achieve this effect, the pivot plane 128 is disposed behind the image plane 118 by an amount equal to the effective focal length of the ocular 122. Or, in other words, the pivot plane is located behind the objective image plane 118 by an amount equal to the effective focal length of the objective lens divided by the magnification of the total optical system. The net effect of gimbaling at the pivot plane 128 is to leave the objective 116 free to form its image in the same location as before the motion input and to leave the ocular 122 undisturbed, except for rotation, so that the eye 120 may inspect the image through the ocular in essentially the same position as before.

Figure 5:
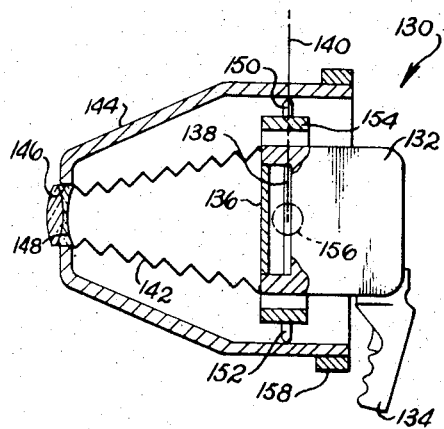
FIG. 5 is a schematic, cross-sectional view of a camera embodying a motion compensation mechanism of this invention.

Referrring now to FIG. 5, there is schematically illustrated a camera 130 including a main body portion 132 formed with a handle 134. The main body portion 132 is formed with a focal plane shutter 136, as known to the art, and film positioning and winding mechanism (not shown) whereby photographic film 138 may be disposed in a film plane 140 just rearward of the focal plane shutter 136. Light shielding bellows 142 extends outward from the front of the main body portion 132 to an objective housing 144 which defines an opening 146 in which is mounted an objective 148 for the camera. The bellows 142 is of much lighter construction than is normal, whereby a much greater degree of flexibility is obtained, and is fitted between the lens 148 and the window portion of the focal plane shutter at the front end of the camera. An annular weight 158 is disposed rearwardly on the objective housing 144 to serve as an inertial counter weight.

The objective housing 144 is gimbaled with respect to the main body portion 132 by means of gimbal pins 150 and 152 extending from the outer surface of a gimbal ring 154 which, in turn, is pivotally disposed on the main body portion by means of gimbal pins not shown but indicated at 156 and which are orthogonal with respect to the gimbal pins 150 and 152. The objective housing is thus gimbaled on a plane coincident with the film plane 140 and, in this regard, the method of operation upon random motion is identical to the mechanism schematically illustrated in FIGS. 4A and 4B. Dampers and a caging mechanism may be provided as desired.

Various further modifications can be made to utilize the teachings herein on a wide variety of optical systems. For example, mechanisms other than a mechanical spring and damper can be used to restore the objective housing position with respect to the remainder of the device. Such other mechanisms may include electrical sensors, an appropriate amplifier, and a torque motor for each axis. While additional elaboration can be used, in some cases with superior results, it is not required for the invention to work. Indeed, in many applications its complexity is not desirable. It is also clear that the devices may be left uncaged at all times or may be caged by means other than by a trigger, a lever and a spring. Prior art in both centering and caging functions is sufficiently broad to allow a wide variety of means to be applied to this invention.

I claim:

1. In an optical system including an objective at one end defining a continuous optical light image path to an image receiving member at the opposite end, a mechanism for compensating for random angular motion of said image receiving member, comprising:
   a housing containing said objective;
   means for angularly decoupling said random angular motion from said objective, said decoupling means including means defining a pivot in said continuous optical light image path about which said housing is pivotally mounted, said pivot being located at a point in said optical path so that the final image formed by said optical system is stabilized, said receiving member being mounted with respect to said housing so as to be subject to said random angular motion; and
   means inertially counterbalancing said objective lens about said pivot to compensate for the random angular motion of said image receiving member relative to the initial line-of-sight by tending to maintain the axis of said objective parallel to said initial line-of-sight.

2. The mechanism according to claim 1 wherein said housing is decoupled to define said pivot between said objective and said image receiving member.

3. The mechanism according to claim 1 wherein said housing is decoupled to define said pivot coincident with said image receiving member.

4. The mechanism according to claim 1 wherein said decoupling means comprises means for gimbaling said housing to said image receiving member thereby to provide said image receiving member with two degrees of angular freedom.

5. The mechanism according to claim 1 wherein said image receiving member is an ocular.

6. The mechanism according to claim 1 further comprising an ocular, wherein said objective forms an inverted image in said optical path, and wherein said image receiving member is an erecting section in said system which presents an upright image to said ocular, said housing being decoupled to define said pivot between said objective and said erecting section, said pivot being spaced ahead of said inverted image by an amount equal to the focal length of said ocular divided by the magnification of said erecting section.

7. The mechanism according to claim 5 wherein said ocular presents an inverted image for viewing, and said housing is decoupled to define said pivot substantially coincident with the forwardmost principal surface of said ocular.

8. The mechanism according to claim 1 wherein said image receiving member is the film in a camera and said housing is decoupled to define said pivot coincident with the plane of said film.

9. The mechanism according to claim 1 further comprising means for snubbing said decoupling means whereby to prevent said decoupling.

10. The mechanism according to claim 9 including a superstructure supporting said image receiving member, said housing being decoupled with respect to said superstructure, and caging members carried internally and externally by said superstructure and housing respectively for snubbing said housing when engaged, and means for moving said superstructure caging member into and out of engagement with said housing caging member.

11. The mechanism according to claim 1 further comprising restoring means for applying a force to said housing tending gradually to align the axis of the image formed by said objective with the optical axis of the instantaneous image receiving member.

* * * * *